United States Patent Office 3,697,283
Patented Oct. 10, 1972

3,697,283
METHOD FOR MAKING A FOOD PRODUCT IN PORTIONS OF CONTROLLED SIZE AND SHAPE
Alan B. Rogers, Palos Park, and Michael Sebring, Downers Grove, Ill., assignors to Armour and Company, Chicago, Ill.
No Drawing. Filed Sept. 8, 1969, Ser. No. 858,561
Int. Cl. A23l 1/32
U.S. Cl. 99—1                                        13 Claims

ABSTRACT OF THE DISCLOSURE

An uncooked food product and method for preparing the same wherein gelatin is incorporated into a food product which is normally liquid before cooking. The food product with added gelatin is then stuffed into a casing and chilled. The molded product is sliced and cooked to provide a controlled portion of food product having natural flavor and texture.

BACKGROUND OF THE INVENTION

This invention relates to a process for making controlled portions of food products which are generally liquid or semi-liquid in their uncooked state and the resultant product. More specifically, the invention relates to a method for placing such liquid food products into a semi-solid state whereby the food product may be sliced into portions of selected size.

Certain food items which are liquid in their uncooked condition, such as pancake batters, scrambled eggs, egg omelets, and the like have long presented a problem of portion control and convenience to the hotel, restaurant and institution businesses. It is generally of paramount importance in these businesses to maintain accurate portion control over each and every food item which is sold or handled. However, those items which are liquid in their uncooked state present a particular problem in that such products are not easily segregated into proportions of consistent size.

Perhaps the most common method of attempting to achieve portion control with this type of food product is to measure out each portion with a spoon or dipper or predetermined size as the portions are cooked. However, this method is not as accurate as is desired, and it may be somewhat messy. Moreover, this method generally requires that the ingredients for the pancake batter, egg batter and the like be purchased in dry form and reconstituted into their liquid form by the user just prior to cooking. This requires the extra step of reconstituting on the part of the user, and since very often in this type of trade or business it is difficult to predict the precise quantity of the items which will be required on any given day, a batch which is either too large or too small may be made up with the resulting waste or shortage of the material.

It has been suggested that the liquid food materials may be placed into molds of desired shapes and frozen. The frozen batter may then be sliced into the desired portions. However this method has also proven to be less than satisfactory for several reasons. The production of a frozen commodity requires substantial refrigeration equipment both at the place of manufacture and at the place of use, as well as special refrigerated transport equipment. Moreover, the equipment required to slice a product which has been frozen solid must be relatively heavy and powerful, such as a band saw and the like. Further, the sawing of the frozen food product into portions on any large scale basis results in the production of a large amount of "sawdust" which represents totally wasted food. Also these frozen slices are not convenient for the user in that if the slices are allowed to thaw, either intentionally or through accidents, the product once again becomes liquid and all proportion integrity is lost.

SUMMARY OF THE INVENTION

We have discovered a food product which overcomes the above-mentioned disadvantages, and it is an object of the present invention to provide a food product which can be subdivided into portions of controlled size.

A further object of the present invention is to provide a method for producing controlled portions of food products which are normally liquid before cooking wherein only ordinary refrigeration is required for their storage and handling.

A still further object of the present invention is to provide a method for making controlled portions of food product wherein the product can be sliced into the desired proportions using equipment which is generally available in hotels, restaurants and the like.

A still further object of the present invention is to provide for the manufacture of controlled portions of food product which is liquid in its uncooked state wherein the cooked portions made by the present method will have a natural flavor and texture.

In the present invention gelatin is added to the food product which is normally liquid in its uncooked state. The food product is then placed into a mold and chilled to a suitable temperature for gelling the food. After the food product has gelled, it is sliced into portions of any desired size and cooked and the cooked food product has a natural flavor and texture.

DESCRIPTION OF PREFERRED EMBODIMENTS

Although the present invention can be used with almost any food product which is liquid and flowable in its uncooked state, we have found it to be particularly useful with such products as pancake batters, egg batters such as scrambled eggs, egg omelets and the like. However, the method can also be used with a variety of other food products, such as sliced beef in barbacue sauce, sloppy joes and the like.

In a preferred embodiment a pancake batter may be prepared from typical ingredients such as pastry flour, corn flour, sugar, salt, milk, eggs, oil and water. To the pancake batter gelatin is added. The gelatin may be added to the batter in the dry form or it may be dissolved in water and added to the batter with the water ingredient. The invention is not intended to be limited in any way to the particular method of incorporating the gelatin into the batter.

The amount of gelatin added may be varied depending upon the particular food product being made, the gel strength of the gelatin and the like. When using high strength gelatin of about 275 bloom, the incorporation of from about 0.5% to 2.5% of such gelatin gives very satisfactory results. Amounts in excess of 2.5% may be used although it is then preferred to use gelatin of lower strength, for example, about 75 bloom. Use of gelatin in amounts less than 0.5% may be ineffective to hold the slices intact. Adding the gelatin in the amount of from about 1.5% to 2.0% is especially preferred.

The gelatin added may be of various bloom strengths, the bloom strength being the weight in grams required to produce a four millimeter depression in a gelatin gel of standard strength (6.66% wt./wt.) at a fixed temperature by a plunger of set dimensions. Such bloom strengths generally vary between 50 and 300 bloom, and we prefer to use gelatin in the range of 175 to 275 bloom.

The uncooked, liquid food product with the gelatin added is placed into a suitable mold. The mold may be a rigid mold, such as a metal mold or it may be a flexible mold, such as a flexible casing of the type generally used in the manufacture of sausage products. For ease of handling and slicing, we prefer to place the batter into a flexible casing.

The encased batter is then chilled to a temperature sufficiently low to set the gelatin. By "set" we refer to the semi-rigid rubbery state which is attained by chilled gelatin at temperatures above freezing. The temperature at which the gelatin will set may vary within fairly wide ranges depending upon the bloom strength of the gelatin used, however these temperatures are generally in the range of 30° to 50° F., and preferably in the range of 30° to 40° F.

After the food product has been chilled to set the gelatin, the product is in a semi-rigid rubbery state in which it can be easily sliced and handled. The product is then either removed from the mold for slicing, or in the case of a flexible casing type of mold, the product may be sliced directly in the casing in a manner similar to sliced bologna and the like. Since the product is in a semi-solid condition, no special equipment is required to slice and it may be sliced on an ordinary meat slicer of the type generally found in hotels and restaurants. The product when sliced holds together extremely well and the individual slices may be handled without breaking, running or falling apart. It is also possible to eliminate the slicing or subdividing step by placing the liquid food with added gelatin into a mold of about the same size as would be obtained by slicing. Thus, a mold having a diameter of about 4 inches and a thickness of about one quarter of an inch would be suitable for the pancake batter.

After slicing to the desired proportions, the product may be placed into a frying pan or onto a grill for cookingk in the normal manner employed in the cooking of pancakes, eggs and so forth. As the food product is heated to cooking temperatures it passes initially into a liquid state and then back into a semi-sold or solid state as the food product coagulates due to cooking. The cooking step alters the physical characteristics of the food ingredients and the gelatin so that the presence of gelatin is not apparent in the finished, cooked product. That is, there is no change in the natural flavor and texture of the product as a result of the gelatin. Pancakes and eggs made by the method of the present invention when cooked will exhibit the natural flavor and texture of pancakes and eggs, and no change in these characteristics is noted as a result of having had the gelatin incorporated into the batter.

The invention will be further illustrated by reference to the following examples:

EXAMPLE I

A pancake batter was prepared according to the following formulation.

| Ingredient: | Wt. percent |
| --- | --- |
| Pastry flour | 26.5 |
| Corn flour | 2.5 |
| Granulated sugar | 1.5 |
| Corn syrup solids | 1.5 |
| Salt | 1.0 |
| Non-fat dry milk | 5.4 |
| Soda | 0.9 |
| Levair | 1.2 |
| Whole egg | 10.0 |
| Oil | 3.0 |
| Water | Approx. 45.0 |

To the batter was added 1.5% of 275 bloom gelatin and the batter was poured into a flexible sausage casing and tied. The encased product was chilled to about 35° F. to allow the gelatin to set. The batter was then sliced into pancake sized proportions and cooked on a grill. The cooked product had the natural flavor and texture of a pancake, with no alteration of the natural flavor and texture due to the presence of gelatin in the cooked product.

EXAMPLE II

A pancake batter was prepared, encased, chilled, sliced and cooked as in Example I except that the formulation included only 0.75% of 275 bloom gelatin. The product held together and sliced well after chilling and had a natural pancake flavor and texture upon cooking.

EXAMPLE III

A pancake batter was prepared, encased, chilled, sliced and cooked as in Example I except that the formulation contained 1.5% of 175 bloom gelatin. The product held together and sliced well after chilling and had a natural pancake flavor and texture when cooked.

EXAMPLE IV

A pancake batter was prepared and processed as in Example III using 0.75% of 175 bloom gelatin. The sliceability after chilling and flavor and texture after cooking were entirely satisfactory.

EXAMPLE V

An egg omlet batter was prepared having the following formulation.

| Ingredient: | Wt. percent |
| --- | --- |
| Whole egg | 90 |
| 75 bloom gelatin | 5 |
| Cotton seed oil | 4 |
| Spices and seasonings | 1 |

The batter was poured into a flexible casing and chilled to about 35° F. to set the gelatin. Upon subsequent slicing and cooking the slives of omelet held together well and the cooked omelet had good flavor and texture.

EXAMPLE VI

Egg omelet batter was prepared according to the following formulation.

| Ingredient: | Wt. percent |
| --- | --- |
| Whole egg | 93.00 |
| Citric acid | 0.174 |
| Salt | 0.777 |
| Monosodiumglutamate | 0.197 |
| White pepper | 0.029 |
| Cotton seed oil | 4.005 |
| Guar gum | 0.108 |
| 275 bloom gelatin | 1.710 |

The omelet batter was poured into a flexible casing and chilled to set the gelatin. Upon subsequent slicing and cooking, the slices held together well and the cooked omelets had a natural egg omelet flavor and texture.

The pancakes and omelets prepared in accordance with the present method were easily sliced on a conventional meat slicer, and the slices remained intact upon handling. Moreover, the slices retained their integrity at temperatures in excess of normal refrigeration temperatures up to and including room temperature. However, it is generally preferred to maintain the temperature of the product below 60° F.

The product prepared by the present invention may be delivered to the user in either a sliced or unsliced condition. For example the chilled and set product may be sliced into slices of predetermined thickness and placed in a stack with a paper or other suitable material separating each slice. Stacks of such slices may then be packaged in suitable carriers such as plastic or Saran bags and wrappers (trademark of The Dow Chemical Company, Midland, Mich.). The encased and set product may be delivered to the user in an unsliced state, resembling a whole bologna or other meat sausage. In this way, the particular user may slice the product into any desired thickness in order to obtain the precise proportion which is desired to be served.

Further convenience is provided in that the products prepared by the present method retain their integrity even after exposure to room temperature for periods of an hour or longer. In this manner, a stack of sliced product may be removed from refrigeration and placed in close proximity to the grill upon which it is to be cooked for ready access. This is particularly important to restaurants during meal hours, for example, when rapid preparation of large quantities of food is required and frequent trips back and forth to a refrigeration unit would be unnecessary and inconvenient. Under such conditions the product manufactured by the present method will retain its slice integrity, whereas a similar frozen product exposed to room temperature conditions for those periods will melt and become an unusable liquid.

Moreover, it has been observed that the product prepared by the present method maintains its slice size and shape during cooking. For example, when a slice is cooked on a grill, the portion of the slice in contact with the grill is heated first. The upper portion of the slice remains cooler and the set of the gelatin holds the slice size and shape intact. As the cooking progresses and the uppermost portion of the slice becomes liquid near cooking temperatures, the lower portion of the slice has already begun to coagulate as a result of cooking, thereby keeping the slice size and shape intact. This assures the user that he will not only have equal portions with each slice, but also that the portions will be uniform in appearance.

If it is desired to hold the products for an extended periods of time they may be frozen and kept for a period of up to a year or even longer. When the product is to be used it is then tempered to suitable slicing temperature (about 30° F. to 40° F.) and then sliced and cooked.

While in the foregoing specification we have set forth the present method in considerable detail for purposes of illustration, it will be understood that considerable variation can be made by those skilled in the art without departing from the spirit or scope of the invention, which is defined in the appended claims.

We claim:

1. A method for making a food product in portions of controlled size and shape comprising incorporating gelatin in the amount of at least about .5 percent by weight into a liquid uncooked food of the class consisting of pancake batters, egg batters and egg omelets, placing said liquid food containing gelatin into a mold, chilling said mold to a temperature sufficiently low to cause said gelatin to set and to gel said food, severing said gelled food into portions of predetermined size, and cooking said severed portions, whereby cooked portions are obtained having controlled size and shape.

2. The process of claim 1 wherein said mold is a flexible casing.

3. A method as set forth in claim 2 wherein said gelled product is severed by slicing through said casing.

4. The process of claim 1 wherein said liquid uncooked food product is a pancake batter.

5. The process of claim 1 wherein said liquid uncooked food prdouct is an egg batter.

6. The process of claim 1 wherein the bloom strength of said gelatin is from about 175 to about 275.

7. The process of claim 1 wherein said food product is chilled to a temperature of about 30°–50° F.

8. The process of claim 1 wherein the bloom strength of said gelatin is 175 and said gelatin is incorporated into said food product in an amount of about 0.75–1.5% by weight.

9. The process of claim 1 wherein the bloom strength of said gelatin is 275 and said gelatin is incorporated into said food product in an amount of about 0.75–1.5% by weight.

10. The process of claim 1 wherein the amount of gelatin added is from about 0.5% to about 5.0%.

11. A method as set forth in claim 1 in which said gelled product is severed by slicing.

12. A method as set forth in claim 1 in which said portions are of substantially equal size and shape.

13. A method as set forth in claim 1 in which said portions are cooked on a grill.

References Cited

UNITED STATES PATENTS 2,808,335  10/1957  Pierce _____ 99—107

OTHER REFERENCES

Woman's Day Encyclopedia of Cookery, vol. 1, pp. 115–119, 123, Fawcett Publications, Inc., New York, 1966.

RAYMOND N. JONES, Primary Examiner

J. R. HOFFMAN, Assistant Examiner

U.S. Cl. X.R.

99—92, 113